(12) United States Patent
Jang

(10) Patent No.: US 9,204,425 B2
(45) Date of Patent: Dec. 1, 2015

(54) TRANSMISSION FRAME AND RESOURCE ALLOCATION METHOD FOR COMMUNICATION SYSTEM INCLUDING BASE STATIONS

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1363 days.

(21) Appl. No.: 12/710,467

(22) Filed: Feb. 23, 2010

(65) Prior Publication Data
US 2010/0238878 A1    Sep. 23, 2010

(30) Foreign Application Priority Data

Mar. 20, 2009    (KR) .................. 10-2009-0023771

(51) Int. Cl.
*H04W 72/04*        (2009.01)
*H04W 84/04*        (2009.01)

(52) U.S. Cl.
CPC ............ *H04W 72/04* (2013.01); *H04W 84/045* (2013.01)

(58) Field of Classification Search
USPC ........................................................ 370/329
See application file for complete search history.

(56) References Cited

U.S. PATENT DOCUMENTS

| | | | |
|---|---|---|---|
| 2004/0218581 A1 | 11/2004 | Cattaneo | |
| 2007/0010203 A1* | 1/2007 | Wee et al. | 455/63.1 |
| 2008/0075032 A1* | 3/2008 | Balachandran et al. | 370/317 |
| 2008/0165881 A1* | 7/2008 | Tao et al. | 375/267 |
| 2009/0176507 A1* | 7/2009 | Wu et al. | 455/456.2 |
| 2012/0046063 A1* | 2/2012 | Chande et al. | 455/522 |

FOREIGN PATENT DOCUMENTS

| | | |
|---|---|---|
| CN | 101204016 A | 6/2008 |
| JP | 10-075231 | 3/1998 |
| JP | 2004-040645 | 2/2004 |
| JP | 2004-146883 | 5/2004 |
| JP | 2009-44397 A | 2/2009 |
| KR | 1994-012922 | 6/1994 |
| KR | 1997-055891 | 7/1997 |
| KR | 1020070090847 | 9/2007 |
| KR | 1020070110958 | 11/2007 |

OTHER PUBLICATIONS

Japanese Office Action mailed Feb. 25, 2014 in counterpart Japanese Application No. 2012-500723 (4 pages, in Japanese).
Chinese Office Action mailed Nov. 11, 2013 in counterpart Chinese Application No. 201080012906.5 (7 pages, in Chinese).
Chinese Office Action mailed Feb. 16, 2015 in Chinese Application No. 201080012906.5 (12 pages in English, 8 pages in Chinese).

* cited by examiner

*Primary Examiner* — Sulaiman Nooristany
(74) *Attorney, Agent, or Firm* — NSIP Law

(57) ABSTRACT

Communication apparatuses and a transmission frame having a downlink subframe are provided. The downlink subframe of the transmission frame may include a downlink coordination zone where a plurality of femto base stations may perform the downlink communication with at least one terminal among a plurality of terminals using a different radio resource, and a downlink shared zone where the plurality of femto base stations may perform the downlink communication with particular terminals among the plurality of terminals using a shared radio resource. The transmission frame may further include an uplink subframe that includes an uplink coordination zone and an uplink shared zone.

35 Claims, 7 Drawing Sheets

TRANSMISSION FRAME AND RESOURCE ALLOCATION METHOD FOR COMMUNICATION SYSTEM INCLUDING BASE STATIONS

CROSS-REFERENCE TO RELATED APPLICATION

This application claims the benefit under 35 U.S.C. §119 (a) of a Korean Patent Application No. 10-2009-0023771, filed on Mar. 20, 2009, in the Korean Intellectual Property Office, the entire disclosure of which is incorporated herein by reference for all purposes.

BACKGROUND

1. Field

The following description relates to a communication system including a plurality of base stations, and more particularly, to a transmission frame and a resource allocation method for a communication system including, for example, a plurality of femto base stations.

2. Description of the Related Art

A plurality of femto base stations may be additionally provided in order to enhance a network capacity. Operation types of the femto base stations may be generally classified into two types. In first type, the femto base stations may use the same frequency resource as a frequency resource of neighboring macro cells. In second type, the femto base stations may use a frequency resource that is different from the frequency resource of the neighboring macro cells.

Where the femto base stations use the same frequency resource as the frequency resource of the neighboring macro cells, frequency efficiency may be enhanced whereas interference may occur between the femto base stations and the macro cells. Where the femto base stations use the frequency resource that is different from the frequency resource of the neighboring macro cells, the interference may be less whereas the frequency efficiency may decrease. It is understood that, while not limited thereto, enhancement of frequency efficiency may refer to a case where, for example, compared to a case where 10 MHz is utilized to transmit/receive 1 Kbyte of data, 1 MHz is utilized to transmit/receive 1 Kbyte of data.

The femto base stations may be clustered within a particular area. For example, a plurality of femto base stations may be provided within a single building. In this case, interference may increase between the femto base stations. In particular, where all the femto base stations installed within the single building use the same frequency resource, interference between the femto base stations may be heightened.

SUMMARY

In one general aspect, there is provided a communication apparatus configured to perform a communication according to a transmission frame, wherein a downlink subframe of the transmission frame includes a downlink coordination zone where a plurality of femto base stations performs a downlink communication with at least one terminal among a plurality of terminals using a different radio resource, and a downlink shared zone where the plurality of femto base stations performs the downlink communication with particular terminals among the plurality of terminals using a shared radio resource.

The particular terminals may be terminals selected from the plurality of terminals, depending on whether the particular terminals are able to simultaneously perform the downlink communication.

The particular terminals may be terminals selected from the plurality of terminals based on at least one of a status of interference channels of the terminals, a distribution thereof, a mobility thereof, and an amount of resource used or required thereof.

A radio resource for the downlink coordination zone and the shared radio resource for the downlink shared zone may be determined based on a distribution of the terminals or an amount of resource used or required thereof.

At least one terminal that performs the downlink communication in the downlink coordination zone may be part of the remaining terminals excluding the particular terminals from the plurality of terminals.

In the downlink coordination zone, the plurality of femto base stations may perform the downlink communication by orthogonally using a radio resource.

A radio resource for the downlink coordination zone and the shared radio resource for the downlink shared zone may be determined by a control apparatus that manages the plurality of femto base stations.

The particular terminals may be selected by a control apparatus that manages the plurality of femto base stations.

In the downlink shared zone, the plurality of femto base stations may perform the downlink communication using the shared radio resource according to a transmit power control scheme or an interference control scheme.

In the downlink shared zone, the plurality of femto base stations may perform the downlink communication using a multi-antenna transmission scheme.

Each of the femto base stations may transmit, to the plurality of terminals, at least one of information associated with the radio resource used in the downlink coordination zone, information associated with the shared radio resource used in the downlink shared zone, and information associated with a transmit power control scheme or an interference control scheme to be applied in the downlink shared zone.

An uplink subframe of the transmission frame may include an uplink coordination zone where the plurality of femto base stations performs an uplink communication with at least one terminal among the plurality of terminals using a different radio resource, and an uplink shared zone where the plurality of femto base stations performs the uplink communication with the particular terminals among the plurality of terminals using a shared radio resource.

The plurality of femto base stations may use the same frequency resource.

In another general aspect, there is provided a control apparatus for use in communication between a plurality of femto base stations and a plurality of terminals, said communication conducted using a transmission frame having a downlink subframe that includes a downlink coordination zone and a downlink shared zone, the control apparatus including a terminal selection unit configured to select particular terminals from the plurality of terminals, depending on whether the particular terminals are able to simultaneously perform a downlink communication, and a resource decision unit configured to: determine a radio resource for each of the femto base stations used in the downlink coordination zone allowing the plurality of femto base stations to perform the downlink communication with at least one terminal among the plurality of terminals using a different radio resource in the downlink coordination zone; and determine a shared radio resource used in the downlink shared zone allowing the plurality of femto base stations to perform the downlink communication with the particular terminals among the plurality of terminals using the shared radio resource in the downlink shared zone.

The control apparatus may further include a frame setting unit configured to set the downlink subframe based on the radio resource for each of the femto base stations used in the downlink coordination zone, and the shared radio resource.

The control apparatus may further include an information generation unit configured to generate information associated with the set downlink subframe to be provided to the plurality of femto base stations, wherein information associated with the set downlink subframe includes at least one of interval information of the downlink coordination zone, interval information of the downlink shared zone, information associated with the radio resource allocated to the at least one terminal, information associated with the radio resource allocated to the particular terminals from the shared radio resource, and information associated with a transmit power control scheme or an interference control scheme to be applied to the particular terminals.

The terminal selection unit may select the particular terminals from the plurality of terminals based on at least one of a status of interference channels of the terminals, a distribution thereof, a mobility thereof, and an amount of resource used or required thereof.

The resource decision unit may determine the radio resource for each of the femto base stations and the shared radio resource based on a distribution of the terminals or an amount of resource used or required thereof.

In the downlink shared zone, the plurality of femto base stations may perform the downlink communication using a transmit power control scheme or an interference control scheme.

In still another general aspect, there is provided a femto base station to communicate with at least one terminal using a transmission frame having a downlink subframe, the downlink subframe including a downlink coordination zone where a plurality of femto base stations performs a downlink communication with at least one terminal among a plurality of terminals using a different radio resource and a downlink shared zone where the plurality of femto base stations performs the downlink communication with particular terminals among the plurality of terminals using a shared radio resource, the femto base station including: an information receiver configured to receive information associated with a radio resource used in the downlink coordination zone, and information associated with the shared radio resource used in the downlink shared zone; an information generation unit configured to generate resource allocation information based on the information associated with the radio resource used in the downlink coordination zone and the information associated with the shared radio resource used in the downlink shared zone; and an information transmitter configured to transmit the resource allocation information to the at least one terminal.

The information generation unit may generate the resource allocation information that includes information associated with at least one of a transmit power control scheme and an interference control scheme to be applied in the downlink shared zone.

The information transmitter may transmit the resource allocation information to the at least one terminal to allow the at least one terminal to perform the downlink communication in the downlink coordination zone or the downlink shared zone, based on the resource allocation information.

The particular terminals may be terminal selected among the plurality of terminals based on at least one of a status of interference channels of the terminals, a distribution thereof, a mobility thereof, and an amount of resource used or required thereof.

In yet another general aspect, there is provided a computer-readable storage medium storing a transmission frame to facilitate communication between communication apparatuses, the transmission frame comprising a data structure including a downlink subframe, wherein the downlink subframe includes a downlink coordination zone where a plurality of femto base stations performs a downlink communication with at least one terminal among a plurality of terminals using a different radio resource, and a downlink shared zone where the plurality of femto base stations performs the downlink communication with particular terminals among the plurality of terminals using a shared radio resource.

The transmission frame may further include an uplink subframe, and the uplink subframe may include an uplink coordination zone where the plurality of femto base stations performs an uplink communication with at least one terminal among the plurality of terminals using a different radio resource, and an uplink shared zone where the plurality of femto base stations performs the uplink communication with the particular terminals among the plurality of terminals using a shared radio resource.

In still yet another general aspect, there is provided a communication apparatus configured to perform a communication according to a transmission frame, wherein a downlink subframe of the transmission frame includes a downlink coordination zone where a plurality of femto base stations performs a downlink communication with at least one terminal among a plurality of terminals, wherein: the downlink coordination zone includes a first interval allocated to a first femto base station and at least one terminal to access the first femto base station, and a second interval allocated to a second femto base station and at least one terminal to access the second femto base station; and the plurality of femto base stations performs the downlink communication by orthogonally using a radio resource.

The downlink subframe of the transmission frame may further include a downlink shared zone where the plurality of femto base stations performs the downlink communication with particular terminals among the plurality of terminals using a shared radio resource.

One or more of the particular terminals may be fixed terminals.

The plurality of femto base stations may use the shared radio resource according to a transmit power control scheme, an interference control scheme, or a multi-antenna transmission scheme to simultaneously perform the downlink communication with respect to the particular terminals.

The plurality of femto base stations may use the same distribution channel resource as a distribution channel resource of a neighboring macro cell.

The plurality of femto base stations may use the same frequency resource.

The radio resource may be one of a frequency resource, a time resource, a space resource, and a code resource, and the first and second intervals may correspond to the radio resource divided into a plurality of resource intervals.

The communication apparatus may be one of a relay station, a terminal among the plurality of terminals, and a femto base station among the plurality of femto base stations.

Other features and aspects will be apparent from the following detailed description, the drawings, and the claims.

Figure 1:
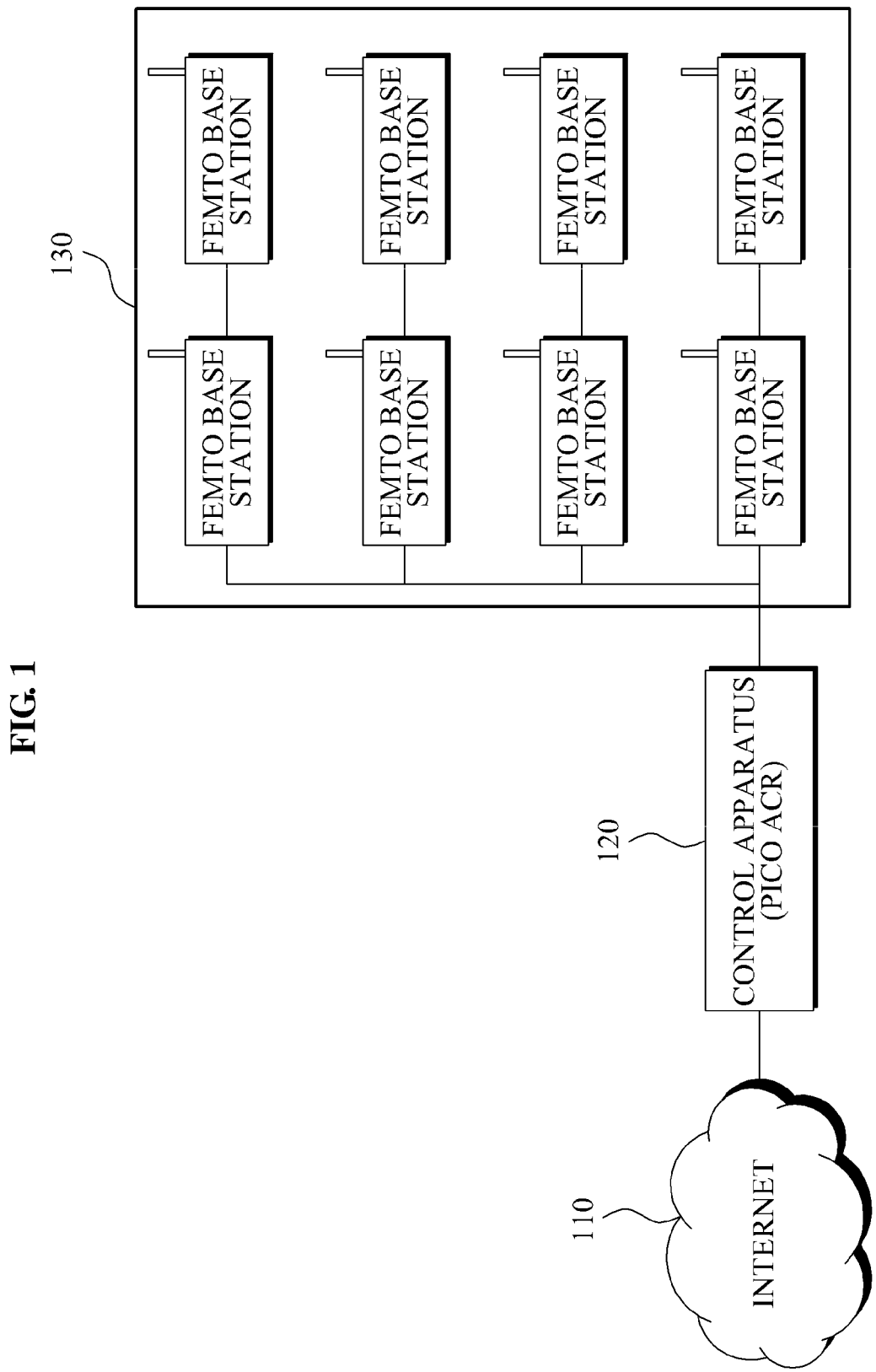
FIG. 1 is a diagram illustrating a plurality of femto base stations installed in a particular area according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions may be omitted for increased clarity and conciseness.

FIG. 1 illustrates a plurality of femto base stations installed in a particular area 130 according to an example embodiment.

Referring to FIG. 1, the plurality of femto base stations may be provided within the particular area 130, for example, a building. The plurality of femto base stations may be controlled and managed by a control apparatus 120 such as a pico access control router (ACR) and the like. The femto base stations may be connected to the Internet 110 via the control apparatus 120. The control apparatus 120 may perform various types of functions such as an Internet protocol (IP) routing function with respect to the femto base stations, a mobility management function, for example, a handover function between the femto base stations, a time synchronization function, and the like. It is understood that the control apparatus 120 may be provided as, for example, a separate apparatus or as part of a base station.

The plurality of femto base stations may use the same frequency resource as a frequency resource of neighboring macro cells (not illustrated in FIG. 1). In order to decrease interference between the femto base stations, radio resources such as a time resource, a space resource, and a code resource may be appropriately allocated to the femto base stations. For example, although the femto base stations use the same frequency resource, the time resource, the spatial resource, or the code resource may be allocated to the femto base stations, or a transmit power control or an interference control may be performed so as to prevent the interference between the femto base stations.

Also, distribution of terminals (not illustrated in FIG. 1) within the particular area 130, mobility thereof, and the amount of resource used or required thereof may be diversified. The desired resource amount of the terminals may be different for each of the femto base stations. Allocating the same amount of radio resource to each of the femto base stations may result in less effective or less efficient use of the radio resources. Accordingly, in order to more effectively or efficiency use the radio resources, radio resources may be appropriately allocated to the femto base stations by considering one or more factors including the distribution of the terminals, the mobility thereof, and the amount of resource used or required thereof.

Figure 2:
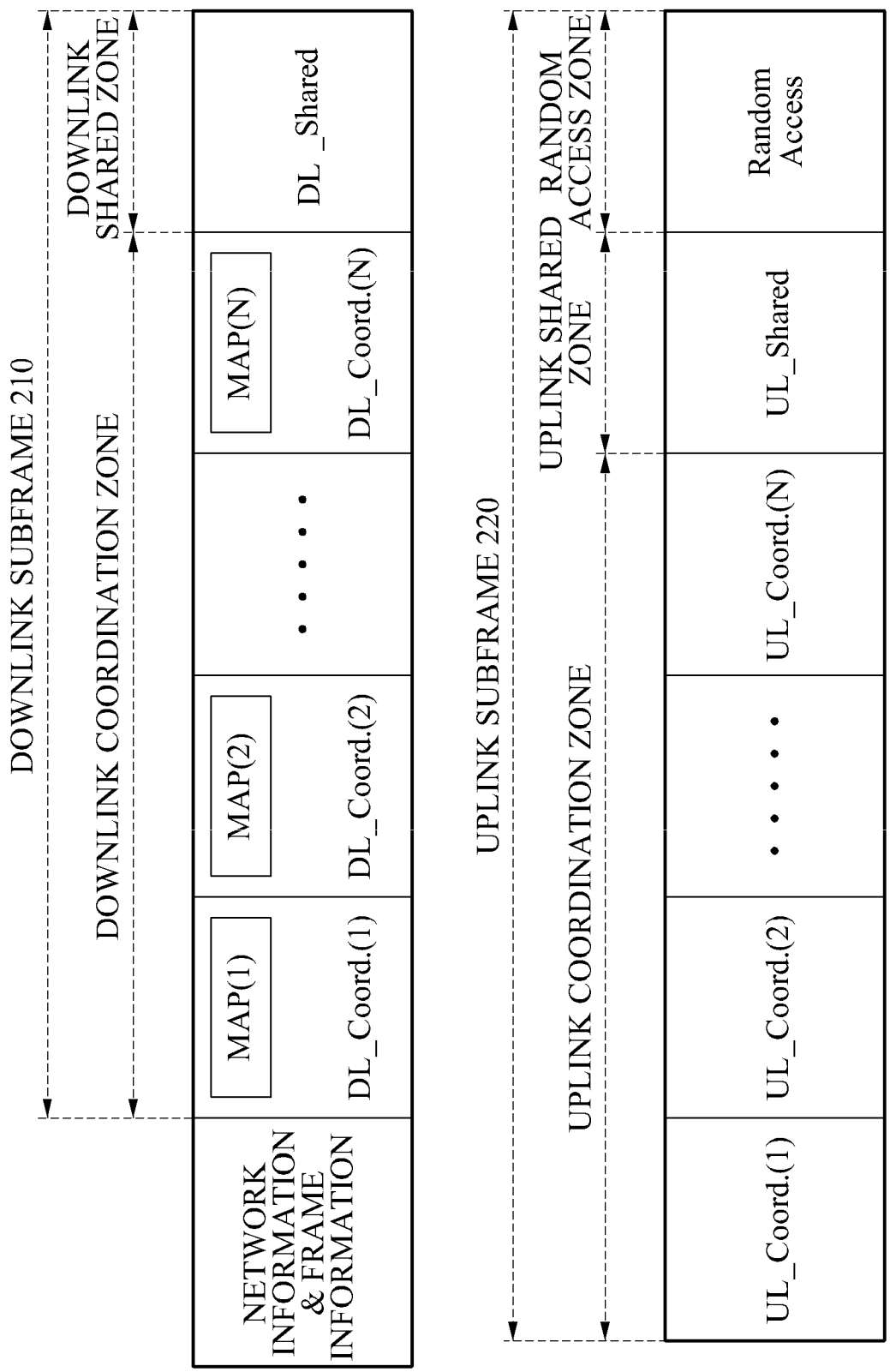
FIG. 2 is diagram illustrating a transmission frame including a downlink subframe and an uplink subframe according to an example embodiment.

FIG. 2 illustrates a transmission frame including a downlink subframe 210 and an uplink subframe 220 according to an example embodiment.

The transmission frame may be applicable to various types of communication apparatuses including femto base stations, terminals, relays, and the like.

Referring to the example of FIG. 2, network information and frame information associated with the transmission frame may be added in front of the downlink subframe 210. The network information and the frame information may be broadcast from each of femto base stations to a plurality of terminals prior to performance of a downlink communication and an uplink communication.

The downlink subframe 210 may include a downlink coordination zone and a downlink shared zone.

In the downlink coordination zone of the downlink subframe 210, a plurality of femto base stations may perform the downlink communication with at least one terminal among a plurality of terminals, using a different radio resource among radio resources used in a macro cell. Each of the femto base stations may prevent interference between the plurality of femto base stations by orthogonally using a resource, for example, a frequency resource, a time resource, a space resource, a code resource, and the like.

A control apparatus, for example, the control apparatus 120 of FIG. 1, that manages the plurality of femto base stations with respect to the downlink coordination zone may allocate a radio resource to the plurality of femto base stations and the plurality of terminals so as to prevent the interference between the plurality of femto base stations. For example, the control apparatus may divide the downlink coordination zone into a plurality of time intervals so that the plurality of femto base stations may orthogonally use the time resource, and thereby may coordinate the downlink coordination zone.

As an example, a first interval DL_Coord.(1) of the downlink coordination zone may be allocated to a femto base station 1 and at least one terminal accessing the femto base station 1. A second interval DL_Coord.(2) of the downlink coordination zone may be allocated to a femto base station 2 and at least one terminal accessing the femto base station 2. An $N^{th}$ interval DL_Coord.(N) of the downlink coordination zone may be allocated to a femto base station N and at least one terminal accessing the femto base station N. Information associated with the allocated intervals may be broadcast, as MAP(i), from each of the femto base stations to the plurality of terminals. Here, i denotes an index of each of the femto base stations.

In the downlink shared zone of the downlink subframe 210, the plurality of femto base stations may simultaneously perform the downlink communication using the same radio resource (hereinafter also referred to as, "shared radio resource"), with particular terminals that are selected from the plurality of terminals. For example, in the downlink shared zone, the plurality of femto base stations may simultaneously perform the downlink communication with the particular terminals among the plurality of terminals using a scheme such as a signal processing scheme, for example, an interference control scheme or a transmit power control scheme, a multi-antenna transmission scheme, and the like, so as to decrease the inter-cell interference.

Here, the particular terminals may be selected from the plurality of terminals by the control apparatus that manages the plurality of femto base stations, depending on whether the particular terminals may simultaneously perform the downlink communication. For example, the control apparatus may select, as the particular terminals, terminals that may simultaneously perform the downlink communication, for example, fixed terminals, and accordingly, may enhance the frequency efficiency and decrease the inter-cell interference.

As an example, the control apparatus may select the particular terminals for the downlink shared zone by considering one or more factors including the status of interference channels of the terminals, distribution thereof, mobility thereof, the amount of resource used or required thereof, and the like.

The control apparatus may select, as the particular terminals, terminals that are generally in a static status, and may also select, as the particular terminals, terminals that have a relatively smaller required resource amount. Also, the control apparatus may determine whether to apply the interference control or the transmit power control based on the status of the interference channels of the terminals, and thereby may select the particular terminals. Further, the control apparatus may select, as the particular terminals, terminals that are relatively further away from each other. Also, the control apparatus may select the particular terminals from the plurality of terminals by collectively considering various types of factors, for example, including factors described above.

Referring back to FIG. 2, the uplink subframe 220 may include an uplink coordination zone, an uplink shared zone, and a random access zone.

The uplink coordination zone of the uplink subframe 220 may be adjusted using various types of schemes. It is understood that the uplink subframe 220 shown in FIG. 2 is one example. In the uplink subframe 220, N intervals included in the uplink coordination zone may be allocated to N femto base stations, respectively. For example, a femto base station 1 and at least one terminal may perform the uplink communication in a first interval UL_Coord.(1) of the uplink coordination zone. A femto base station N and at least one terminal may perform the uplink communication in an $N^{th}$ terminal UL_Coord.(N) of the uplink coordination zone. In the random access zone, the plurality of terminals may randomly access the plurality of femto base stations to perform the uplink communication.

The femto base stations and the terminals may operate similarly in the downlink subframe 210 and the uplink subframe 220. Accordingly, further descriptions related to the uplink subframe 220 will be omitted for conciseness.

Figure 3:
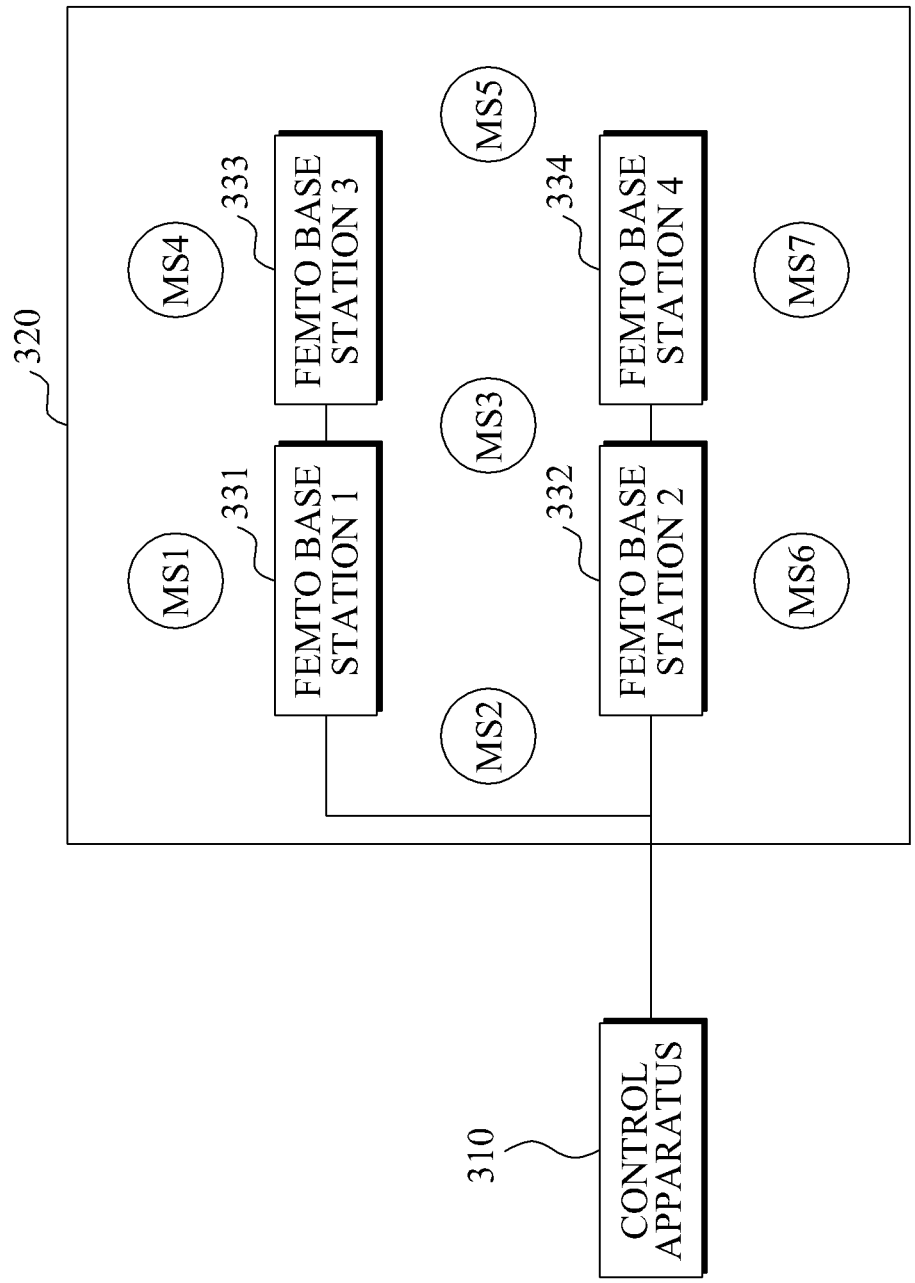
FIG. 3 is a diagram illustrating a plurality of femto base stations installed in a particular area and a plurality of terminals adjacent to the plurality of femto base stations according to an example embodiment.

FIG. 3 illustrates a plurality of femto base stations (1, 2, 3, 4) 331, 332, 333, and 334 installed in a particular area 320, and a plurality of terminals (MS1, MS2, MS3, MS4, MS5, MS6, MS7) according to an example embodiment. For example, the plurality of terminals (MS1, MS2, MS3, MS4, MS5, MS6, MS7) may be in position adjacent to the plurality of femto base stations (1, 2, 3, 4) 331, 332, 333, and 334 as shown in FIG. 3.

The plurality of terminals (MS1, MS2, MS3, MS4, MS5, MS6, MS7) may exist around the femto base stations (1, 2, 3, 4) 331, 332, 333, and 334. Here, factors such as the status of interference channels of the terminals (MS1, MS2, MS3, MS4, MS5, MS6, MS7), mobility thereof, distribution thereof, and the amount of resource used or required thereof may vary in real time. A control apparatus 310 may select particular terminals based on one or more of these factors. Here, the particular terminals denote terminals that may simultaneously perform a downlink communication or an uplink communication in a downlink shared zone or an uplink shared zone, for example.

As an illustration, it is assumed that the terminals (MS1, MS6, MS4, MS7) are selected as the particular terminals. In this case, base stations serving the terminals (MS1, MS6, MS4, MS7) may be the femto base stations (1, 2, 3, 4) 331, 332, 333, and 334, respectively. Here, the femto base stations (1, 2, 3, 4) 331, 332, 333, and 334 may simultaneously perform the downlink communication or the uplink communication with the terminals (MS1, MS6, MS4, MS7) in the downlink shared zone or the uplink shared zone, using a scheme such as an interference control scheme, a transmit power control scheme, a multi-antenna transmission scheme, and the like. The remaining terminals (MS2, MS3, MS5) may be served by the femto base stations (1, 2, 3, 4) 331, 332, 333, and 334 in the downlink coordination zone or the uplink coordination zone.

Figure 4:
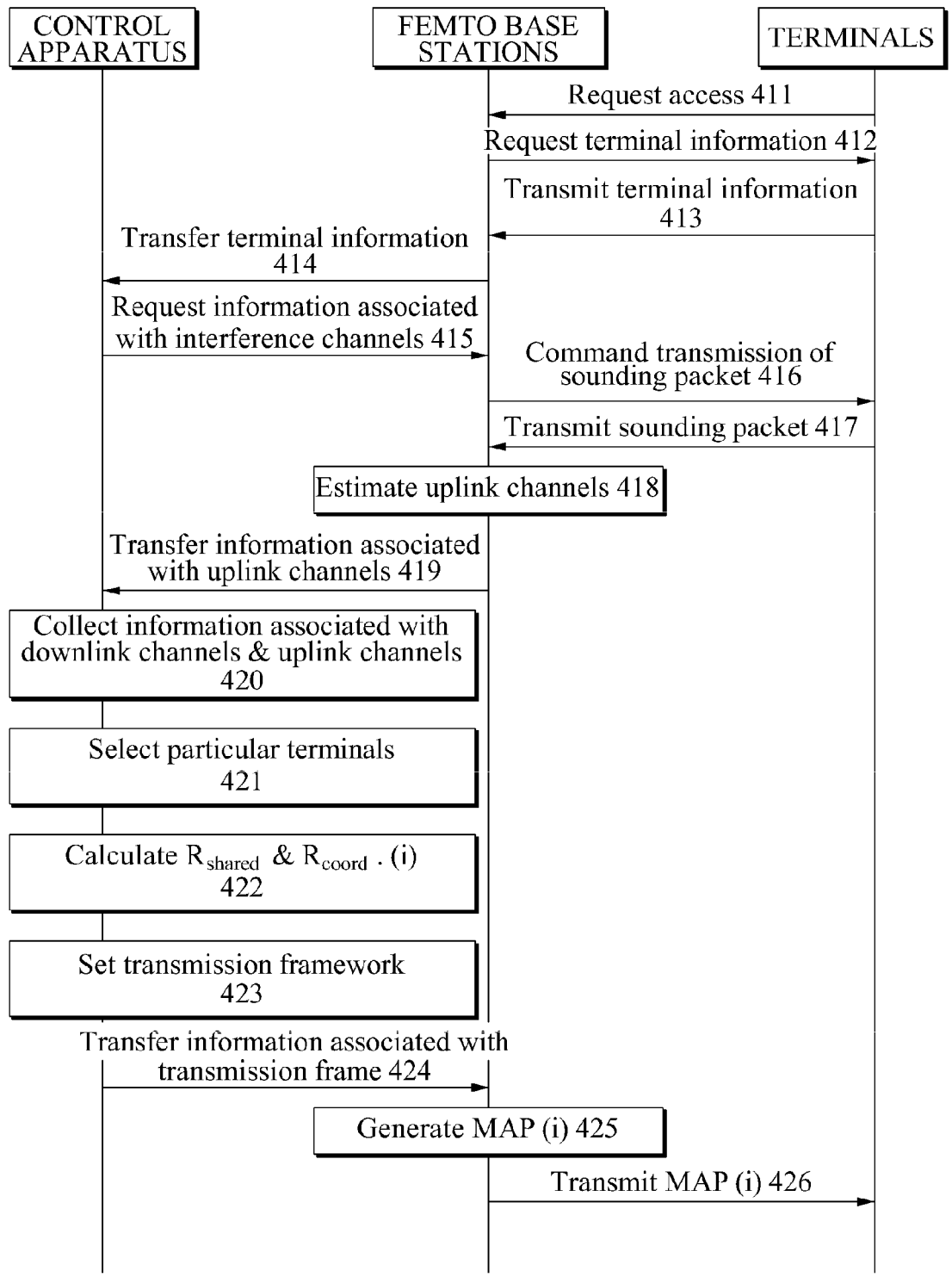
FIG. 4 is a flowchart illustrating an operating method of a control apparatus, femto base stations, and terminals according to an example embodiment.

FIG. 4 illustrates a flowchart of an operating method of a control apparatus, femto base stations, and terminals according to an example embodiment.

Referring to FIG. 4, the terminals may request corresponding femto base stations for an access (411). For example, each of the femto base stations may request from the terminal(s) requesting an access to that femto base station, for terminal information (412). Here, each of the terminals may transmit the terminal information to the corresponding femto base stations (413). The terminal information may include, for example, mobility information of the terminal and the amount of resource used or required thereof.

Each of the femto base stations may transfer the terminal information to the control apparatus that may manage the femto base stations (414). The control apparatus may request the femto base stations for information associated with interference channels of the terminals (415). The femto base stations may command the terminals to transmit a sounding packet in order to estimate uplink channels of the terminals (416). Here, the uplink channels may include signal channels and the interference channels. In response, the terminals may transmit the sounding packet to the femto base stations (417). The femto base stations may estimate the uplink channels using the sounding packet (418), and transfer to the control apparatus, information associated with the estimated uplink channels (419).

Although not illustrated in FIG. 4, the uplink channels may be considered to be about the same as the downlink channels in a time division duplex (TDD) system. Accordingly, in the TDD system, the femto base stations may verify the downlink channels based on the uplink channels. In a frequency division duplex (FDD) system, the uplink channels may not be considered to be the same as the downlink channels. Here, the terminals may estimate the downlink channels using a pilot signal, and feed back to the femto base stations, information associated with the estimated downlink channels.

Referring back to FIG. 4, the control apparatus may collect information associated with the downlink channels and information associated with the uplink channels (420). The control apparatus may verify the terminal information in addition to information associated with the downlink channels and information associated with the uplink channels. Information associated with the downlink channels, information associated with the uplink channels, and the terminal information may be periodically or aperiodically updated.

The control apparatus may select particular terminals or a set G of particular terminals from the plurality of terminals based on information associated with the interference channels of the terminals, and the terminal information.

Here, the particular terminals may denote terminals that may simultaneously perform the downlink communication or the uplink communication with the femto base stations using a shared radio resource in a downlink shared zone or an uplink shared zone. For example, the particular terminals denote terminals that may simultaneously transmit or receive data using the shared radio resource in the downlink shared zone or the uplink shared zone. Here, the femto base stations may use, for example, an interference control scheme, a transmit power control scheme, a multi-antenna transmission scheme, and the like in the downlink shared zone or the uplink shared zone, so as to decrease the inter-cell interference and enhance the frequency efficiency.

The control apparatus may determine a shared radio resource $R_{shared}$ for the particular terminals in the downlink shared zone or the uplink shared zone, and a radio resource $R_{coord.}(i)$ for terminals in a downlink coordination zone or an uplink coordination zone (422). Here, the terminals that are activated in the downlink coordination zone or the uplink coordination zone may denote the remaining terminals excluding the particular terminals from the plurality of terminals. Also, i denotes an index of each of the femto base stations. The shared radio resource $R_{shared}$ and the radio resource $R_{coord.}(i)$ may include a time resource, a space resource, and a code resource, and may generally indicate the time resource. For example, the control apparatus may determine the shared radio resource $R_{shared}$ and the radio resource $R_{coord.}(i)$ by considering a distribution of the terminals or an amount of resource used or required thereof.

The control apparatus may set a transmission framework based on the shared radio resource $R_{shared}$ and the radio resource $R_{coord.}(i)$ (423). Here, coordination zones of the transmission frame, that is, the downlink coordination zone and the uplink coordination zone, and shared zones of the transmission frame, that is, the downlink shared zone and the uplink shared zone, may be variably adjusted according to the shared radio resource $R_{shared}$ and the radio resource $R_{coord.}(i)$.

The control apparatus may transfer, to the femto base stations, information associated with the set transmission frame (424). Here, information associated with the transmission frame may include information associated with a downlink subframe and information associated with an uplink subframe. Information associated with the downlink subframe may include interval information of the downlink coordination zone, interval information of the downlink shared zone, information associated with radio resources allocated for the downlink coordination zone, information associated with radio resources allocated for particular terminals from shared radio resources, and information associated with a transmit power control or an interference control to be applied to the particular terminals. Similarly, information associated with the uplink subframe may include interval information of the uplink coordination zone, interval information of the uplink shared zone, information associated with radio resources allocated for the uplink coordination zone, information associated with radio resources allocated for particular terminals from the shared radio resources, and information associated with the transmit power control or the interference control to be applied to the particular terminals.

Each of the femto base stations may generate resource allocation information MAP(i) based on the received information (425). The resource allocation information MAP(i) may include information associated with the downlink subframe and information associated with the uplink subframe.

Each of the femto base stations may transmit the resource allocation information MAP(i) to the plurality of terminals (426). In this example, each of the terminals may verify whether a corresponding terminal is a particular terminal based on the resource allocation information MAP(i), and verify the radio resource allocated to the terminal.

Although not illustrated in FIG. 4, the femto base stations and the terminals may perform the uplink communication or the downlink communication according to the transmission frame set by the control apparatus.

Figure 5:
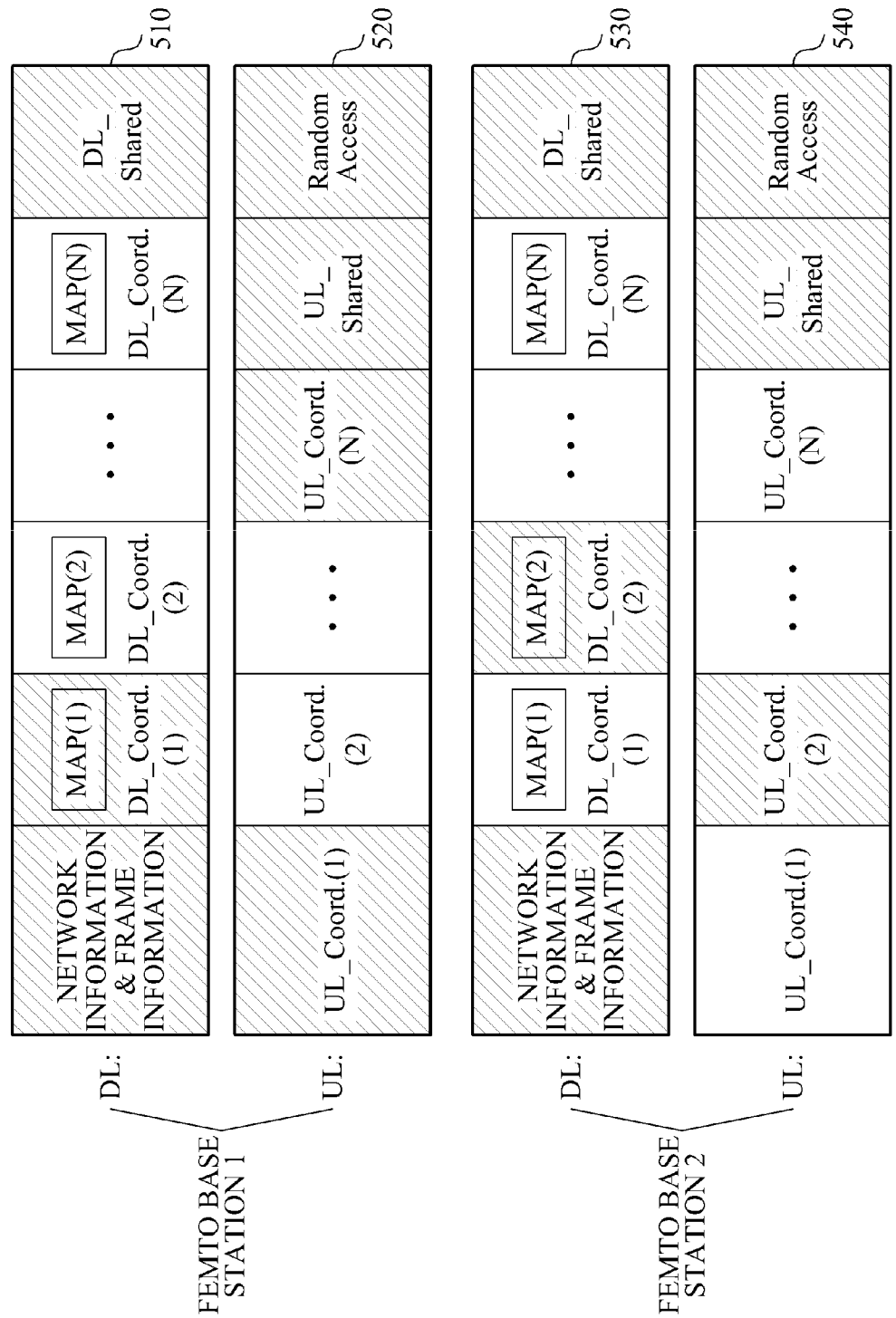
FIG. 5 is a diagram illustrating an example of a femto base station 1 and a femto base station 2 based on a transmission frame according to an example embodiment.

FIG. 5 illustrates an example of a femto base station 1 and a femto base station 2 based on a transmission frame according to an example embodiment.

FIG. 5 illustrates a downlink subframe DL 510 and an uplink subframe UL 520 of the femto base station 1, and a downlink subframe DL 530 and an uplink subframe UL 540 of the femto base station 2. The femto base station 1 and terminals accessing the femto base station 1 may perform a downlink communication and an uplink communication according to the downlink subframe DL 510 and the uplink subframe 520. The femto base station 2 and terminals accessing the femto base station 2 may perform the downlink communication and the uplink communication according to the downlink subframe DL 530 and the uplink subframe UL 540.

The femto base station 1 and the terminals accessing the femto base station 1 may transmit and receive data, as the cases may be, in gray shaded regions of the downlink subframe DL 510 and the uplink subframe UL 520. For example, the femto base station 1 may transmit network information and frame information. The femto base station 1 may transfer, to the terminals accessing the femto base station 1, information associated with the downlink subframe DL 510 and information associated with the uplink subframe UL 520. In DL_Coord.(1), the femto base station 1 and the remaining terminals, excluding particular terminals among the terminals accessing the femto base station 1, may perform the downlink communication using a coordinated radio resource. Where DL_Coord.(1) is terminated, the femto base station 1 and the terminals accessing the femto base station 1 may suspend the downlink communication.

The femto base station 1 and the particular terminals, selected from the terminals accessing the femto base station 1, may perform the downlink communication using a shared radio resource. The femto base station 1 may simultaneously perform the downlink communication with other femto base stations using an interference control scheme, a transmit power control scheme, and the like.

The femto base station 1 and the remaining terminals, excluding the particular terminals, may perform the uplink communication in UL_Coord.(1) using the coordinated radio resource. Selectively, the terminals may arbitrarily access the femto base station 1 in a random access zone to perform the uplink communication.

The femto base station 2 and the terminal accessing the femto base station 2 may also transmit network information and frame information. Where DL_Coord.(1) is terminated, the femto base station 2 may transfer, to the terminals accessing the femto base station 2, information associated with the downlink subframe DL 530 and information associated with the uplink subframe UL 540, using MAP(2). In DL_Coord.(2), the femto base station 2 and the remaining terminals, excluding particular terminals among the terminals accessing the femto base station 2, may perform the downlink communication using a coordinated radio resource. Where D_Coord. (2) is terminated, the femto base station 2 and the terminals accessing the femto base station 2 may suspend the downlink communication.

The femto base station 2 and the particular terminals, selected from the terminals accessing the femto base station 2, may perform the downlink communication using a shared radio resource. The femto base station 2 may simultaneously perform the downlink communication with other femto base stations using an interference control scheme, a transmit power control scheme, and the like.

Figure 6:
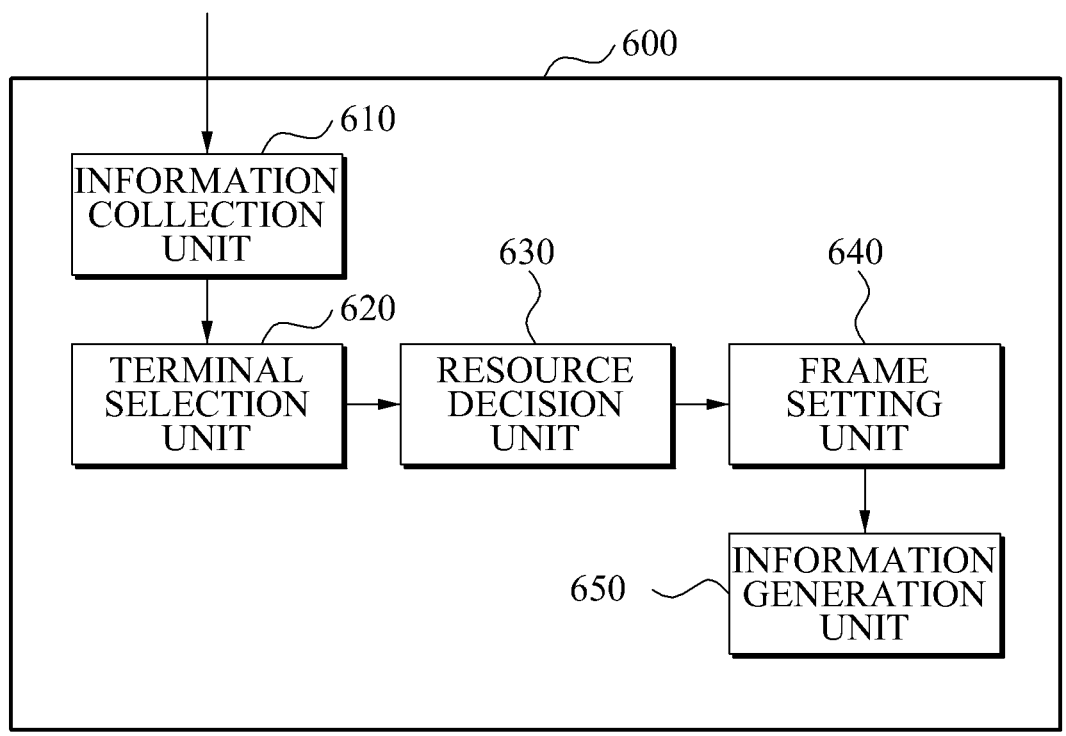
FIG. 6 is a block diagram illustrating a control apparatus according to an example embodiment.

FIG. 6 illustrates a control apparatus 600 according to an example embodiment.

Referring to FIG. 6, the control apparatus 600 includes an information collection unit 610, a terminal selection unit 620, a resource decision unit 630, a frame setting unit 640, and an information generation unit 650.

The information collection unit 610 collects one or more information with respect to terminals such as information associated with downlink channels of the terminals, information associated with uplink channels thereof, distribution thereof, mobility thereof, and an amount of resource used or required thereof.

The terminal selection unit 620 selects particular terminals from the plurality of terminals, depending on whether the particular terminals may simultaneously perform a downlink communication based on the collected information. The terminal selection unit 620 may select the particular terminals based on at least one of a status of interference channels of the terminals, the distribution thereof, the mobility thereof, and the amount of resource used or required thereof.

The resource decision unit 630 determines a radio resource for each of femto base stations used in a downlink coordination zone, and a shared radio resource used in a downlink shared zone. For example, the resource decision unit 630 may determine the radio resource for each of the femto base stations and the shared radio resource, based on the distribution of the terminals or the amount of resource used or required thereof.

The frame setting unit 640 sets a downlink subframe based on the radio resource for each of the femto base stations used in the downlink coordination zone, and the shared radio resource.

The information generation unit 650 generates information associated with the set downlink subframe to be provided to the femto base stations. For example, the information associated with the set downlink subframe may include at least one of interval information of the downlink coordination zone, interval information of the downlink shared zone, information associated with the radio resource allocated to the at least one terminal, information associated with the radio resource allocated to the particular terminals from the shared radio resource, and information associated with a transmit power control or an interference control to be applied to the particular terminals.

Figure 7:
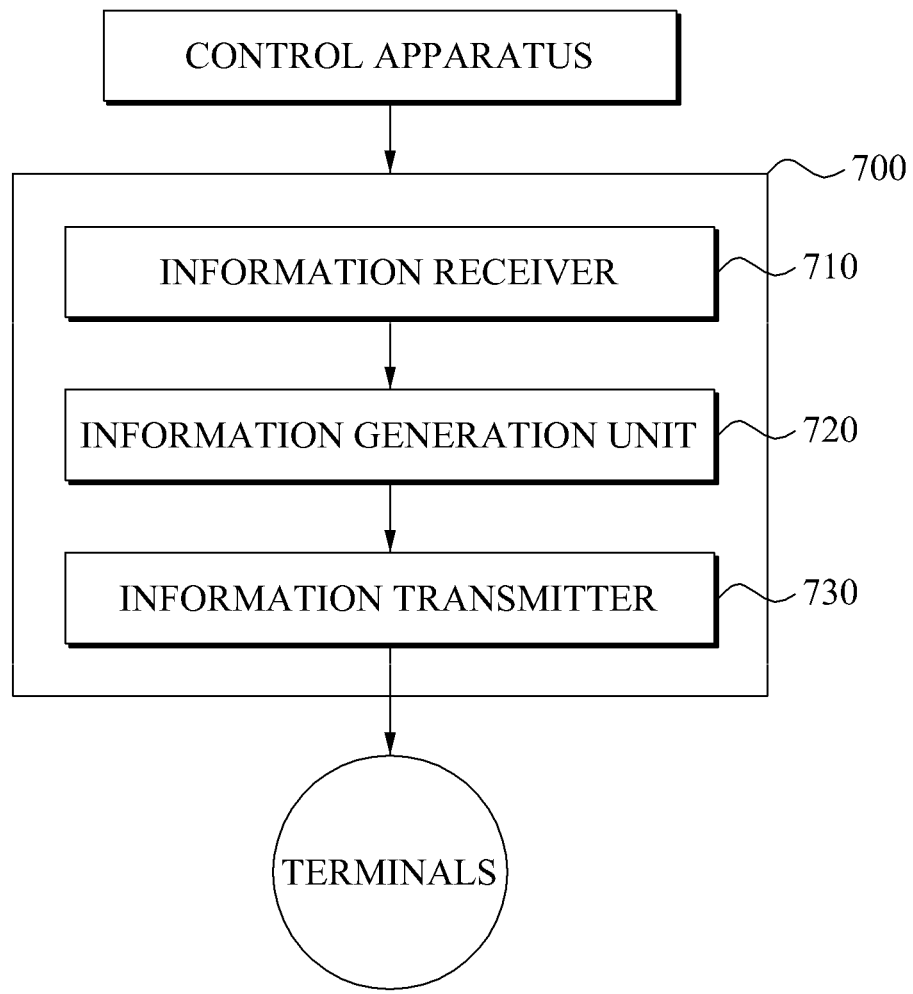
FIG. 7 is a diagram illustrating a femto base station according to an example embodiment.

FIG. 7 illustrates a femto base station 700 according to an example embodiment. FIG. 7 also illustrates a control apparatus and a plurality of terminals.

Referring to FIG. 7, the femto base station 700 includes an information receiver 710, an information generation unit 720, and an information transmitter 730.

The information receiver 710 receives, from the control apparatus that manages a plurality of femto base stations, information associated with a radio resource used in a downlink coordination zone and information associated with a shared radio resource used in a downlink shared zone.

The information generation unit 720 generates resource allocation information based on the information associated with the radio resource used in the downlink coordination zone and the information associated with the shared radio resource used in the downlink shared zone. The information generation unit may generate the resource allocation information that includes information associated with at least one of a transmit power control or an interference control to be applied in the downlink shared zone.

The information transmitter 730 transmits the resource allocation information to the plurality of terminals. Each of the terminals may perform a downlink communication in the downlink coordination zone or the downlink shared zone based on the resource allocation information.

Descriptions made above with reference to FIGS. 1 through 5 may be applicable to the control apparatus 600 of FIG. 6 and the femto base station 700 of FIG. 7. Therefore, further description thereof will be omitted for conciseness.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media and program instructions may be those specially designed and constructed, or they may be of the kind well-known and available to those having skill in the computer software arts. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to example(s) described above, a transmission frame and a resource allocation method may be provided for a communication system including a plurality of femto base stations within a limited area, for example, a building, wherein the transmission frame includes a downlink coordination zone and a downlink shared zone so as to decrease interference between the femto base stations and enhance the frequency efficiency.

According to example(s) described above, a control apparatus managing femto base stations may receive, from each femto base station, and update information, for example, distribution, mobility, amount of resource used or a required, and the like, associated with one or more terminals accessing the corresponding femtocell. The control apparatus may collect interference channel information between the femto base stations for each terminal. The control apparatus may select particular terminals, among a plurality of terminals, capable of performing a simultaneous transmission/reception through, for example, a transmit power control and a interference control, based on the above channel information, and may determine a radio resource $R_{shared}$ based on a desired or required resource amount for each of the particular terminals. The control apparatus may determine a radio resource $R_{coord}(i)$ for each femto base station based on a number of terminals that are not included in the groups of particular terminals, and a desired or required radio resource of a corresponding terminal. For example, i with respect to a femto base station may have a value between 1 and N, and N denotes a total number of femto base stations within an area, for example, a building. Accordingly, the control apparatus may divide a transmission framework into a coordination zone and a shared zone using the same resource, for example, time, sub-frequency, and the like, as a macro cell. Also, the coordination zone may be further divided for each femto base station based on the $R_{coord}(i)$. A femto base station (i) may generate uplink and downlink MAP(i) of terminals that are not included in the group of particular terminals, using DL_Coord.(i) and UL_Coord.(i) that are allocated based on the $R_{coord}(i)$. With respect to terminals included in the group of particular terminals, the femto base station (i) may receive, from the control apparatus, scheduling information of a corresponding terminal using the shared zone, a transmit power control scheme, and an interference control signal processing scheme, and add them to MAP(i).

According to example(s) described above, there may be provided a method of enabling femto base stations within an area, for example, a building, to have the same transmission framework, and dividing the transmission frame work into a coordination zone where the femto base stations use mutually orthogonal resources, and a shared zone where the femto base stations share the resources, when the femto base stations use a resource that is the same as a resource of a macro cell. The shared zone may be shared by particular terminals included in the area, for example, the building. In the shared zone, resources, for example, time, sub-frequency, and the like, are used based on channel characteristics of the particular terminals. The coordination zone may be designated as an interval for terminals not using the shared zone, and may be divided and allocated for each femto base station based on an amount of resource used or required for each femto base station. A transmission interval within the transmission framework may be determined using a control apparatus managing the femto base stations. The particular terminals, that is, terminals capable of performing a simultaneous transmission/reception through, for example, a transmit power control or an interference control, may be determined based on channel information. An amount of radio resource $R_{shared}$ needed may be determined based on an amount of resource needed for each of the particular terminals, and the shared zone may be allocated based on the determined radio resource amount $R_{shared}$. An amount of radio resource $R_{coord}(i)$ for each femto base station may be determined based on a number of terminals not included in the group of particular terminals and an amount of resource needed for a corresponding terminal. Based on this, the coordination zone may be divided for each femto base station.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, and a portable lab-top PC, and other devices including fixed devices capable of communication consistent with that disclosed herein.

Moreover, a control apparatus disclosed herein may be provided as a separate apparatus or as part of, for example, a base station.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus comprising:
   a processor configured to perform a communication according to a transmission frame comprising a downlink subframe that comprises
      a downlink coordination zone comprising
         a first interval allocated to only a first femto base station, among femto base stations, and at least one first terminal, among terminals, the first femto base station performing a downlink communication with the at least one first terminal, using the first interval, and
         a second interval allocated to only a second femto base station, among the femto base stations, and at least one second terminal, among the terminals, the second femto base station performing a downlink communication with the at least one second terminal, using the second interval, and
      a downlink shared zone where the femto base stations perform a downlink communication with particular terminals, among the terminals, using a shared radio resource.

2. The communication apparatus of claim 1, wherein the particular terminals are selected from the terminals, depending on whether the particular terminals are able to simultaneously perform the downlink communication with the femto base stations.

3. The communication apparatus of claim 1, wherein the particular terminals are selected from the terminals based on a status of interference channels of the terminals, or a distribution thereof, or a mobility thereof, or an amount of resource used or required thereof, or any combination thereof.

4. The communication apparatus of claim 1, wherein a radio resource for the downlink coordination zone and the shared radio resource for the downlink shared zone are determined based on a distribution of the terminals or an amount of resource used or required thereof.

5. The communication apparatus of claim 1, wherein the at least one first terminal and the at least one second terminal are a portion of remaining terminals excluding the particular terminals from the terminals.

6. The communication apparatus of claim 1, wherein, in the downlink coordination zone, the first and second femto base stations perform the downlink communication with the at least one first terminal and the at least one second terminal, respectively, by orthogonally using a radio resource.

7. The communication apparatus of claim 1, wherein a radio resource for the downlink coordination zone and the shared radio resource for the downlink shared zone are determined by a control apparatus that manages the femto base stations.

8. The communication apparatus of claim 1, wherein the particular terminals are selected from the terminals by a control apparatus that manages the femto base stations.

9. The communication apparatus of claim 1, wherein, in the downlink shared zone, the femto base stations perform the downlink communication with the particular terminals, according to a transmit power control scheme or an interference control scheme.

10. The communication apparatus of claim 1, wherein, in the downlink shared zone, the femto base stations perform the downlink communication with the particular terminals, using a multi-antenna transmission scheme.

11. The communication apparatus of claim 1, wherein each of the femto base stations transmits, to the terminals, information of a radio resource used in the downlink coordination zone, or information of the shared radio resource used in the downlink shared zone, or information of a transmit power control scheme or an interference control scheme to be applied in the downlink shared zone, or any combination thereof.

12. The communication apparatus of claim 1, wherein the transmission frame further comprises an uplink subframe comprising:
  an uplink coordination zone comprising
    a third interval allocated to only the first femto base station and the at least one first terminal, the first femto base station performing an uplink communication with the at least one first terminal, using the third interval,
    a fourth interval allocated to only the second femto base station and the at least one second terminal, the second femto base station performing an uplink communication with the at least one second terminal, using the fourth interval; and
  an uplink shared zone where the femto base stations perform an uplink communication with the particular terminals, using another shared radio resource.

13. The communication apparatus of claim 1, wherein the femto base stations use a same frequency resource.

14. A control apparatus configured to control communication between femto base stations and terminals, the communication using a transmission frame comprising a downlink subframe that comprises a downlink coordination zone and a downlink shared zone, the control apparatus comprising:
  a processor configured to
    select particular terminals from the terminals, depending on whether the particular terminals are able to simultaneously perform a downlink communication with the femto base stations,
    determine a radio resource for the downlink coordination zone comprising
      a first interval allocated to only a first femto base station, among the femto base stations, and at least one first terminal, among the terminals, the first femto base station performing a downlink communication with the at least one first terminal, using the first interval, and
      a second interval allocated to only a second femto base station, among the femto base stations, and at least one second terminal, among the terminals, the second femto base station performing a downlink communication with the at least one second terminal, using the second interval, and
    determine a shared radio resource for the downlink shared zone where the femto base stations perform a downlink communication with the particular terminals, using the shared radio resource.

15. The control apparatus of claim 14, wherein the processor is further configured to:
  set the downlink subframe based on the radio resource and the shared radio resource.

16. The control apparatus of claim 15, wherein the processor is further configured to:
  generate information of the set downlink subframe to be provided to the femto base stations,
  wherein information of the set downlink subframe comprises information of the downlink coordination zone, or information of the downlink shared zone, or information of the radio resource, or information of the shared radio resource allocated to the particular terminals, or information of a transmit power control scheme or an interference control scheme to be applied to the particular terminals, or any combination thereof.

17. The control apparatus of claim 14, wherein the processor is configured to:
  select the particular terminals from the terminals based on a status of interference channels of the terminals, or a distribution thereof, or a mobility thereof, or an amount of resource used or required thereof, or any combination thereof.

18. The control apparatus of claim 14, wherein the processor is configured to:
  determine the radio resource and the shared radio resource based on a distribution of the terminals or an amount of resource used or required thereof.

19. The control apparatus of claim 14, wherein, in the downlink shared zone, the femto base stations perform the downlink communication with the particular terminals, using a transmit power control scheme or an interference control scheme.

20. A femto base station configured to communicate with a terminal, using a transmission frame comprising a downlink subframe that comprises a downlink coordination zone and a downlink shared zone, the femto base station comprising:
  a processor configured to
    receive information of a radio resource for the downlink coordination zone, and information of a shared radio resource for the downlink shared zone where femto base stations perform a downlink communication with particular terminals, among terminals, using the shared radio resource, the downlink coordination zone comprising
      a first interval allocated to only a first femto base station, among the femto base stations, and at least one first terminal, among the terminals, the first femto base station performing a downlink communication with the at least one first terminal, using the first interval, and
      a second interval allocated to only a second femto base station, among the femto base stations, and at least one second terminal, among the terminals, the second femto base station performing a downlink communication with the at least one second terminal, using the second interval,
    generate resource allocation information based on the information of the radio resource and the information of the shared radio resource, and transmit the resource allocation information to the terminal.

21. The femto base station of claim 20, wherein the resource allocation information comprises information of a transmit power control scheme and/or an interference control scheme to be applied in the downlink shared zone.

22. The femto base station of claim 20, wherein the terminal performs a downlink communication with the femto base station in the downlink coordination zone or the downlink shared zone, based on the resource allocation information.

23. The femto base station of claim 20, wherein the particular terminals are selected from the terminals based on a status of interference channels of the terminals, or a distribution thereof, or a mobility thereof, or an amount of resource used or required thereof, or any combination thereof.

24. A non-transitory computer-readable storage medium storing a transmission frame to facilitate communication between communication apparatuses, the transmission frame comprising a data structure that comprises a downlink subframe, the downlink subframe comprising:
  a downlink coordination zone comprising
    a first interval allocated to only a first femto base station, among femto base stations, and at least one first terminal, among terminals, the first femto base station performing a downlink communication with the at least one first terminal, using the first interval, and
    a second interval allocated to only a second femto base station, among the femto base stations, and at least one second terminal, among the terminals, the second femto base station performing a downlink communication with the at least one second terminal, using the second interval; and
  a downlink shared zone where the femto base stations perform a downlink communication with particular terminals, among the terminals, using a shared radio resource.

25. The computer-readable storage medium of claim 24, wherein the transmission frame further comprises an uplink subframe that comprises:
  an uplink coordination zone comprising
    a third interval allocated to only the first femto base station and the at least one first terminal, the first femto base station performing an uplink communication with the at least one first terminal, using the third interval, and
    a fourth interval allocated to only the second femto base station and the at least one second terminal, the second femto base station performing an uplink communication with the at least one second terminal, using the fourth interval; and
  an uplink shared zone where the femto base stations perform an uplink communication with the particular terminals, using another shared radio resource.

26. A communication apparatus comprising:
  a processor configured to perform a communication according to a transmission frame comprising a downlink subframe that comprises a downlink coordination zone, the downlink coordination zone comprising
    a first interval allocated to a only first femto base station, among femto base stations, and at least one first terminal, among terminals, the first femto base station performing a downlink communication with the at least one first terminal, and
    a second interval allocated to only a second femto base station, among the femto base stations, and at least one second terminal, among the terminals, the second femto base station performing a downlink communication with the at least one second terminal, using the second interval.

27. The communication apparatus of claim 26, wherein the downlink subframe further comprises a downlink shared zone where the femto base stations perform a downlink communication with particular terminals, among the terminals, using a shared radio resource.

28. The communication apparatus of claim 27, wherein one or more of the particular terminals are fixed terminals.

29. The communication apparatus of claim 27, wherein the femto base stations simultaneously perform the downlink communication with the particular terminals according to a transmit power control scheme, or an interference control scheme, or a multi-antenna transmission scheme.

30. The communication apparatus of claim 26, wherein the femto base stations use a same distribution channel resource as a distribution channel resource of a neighboring macro cell.

31. The communication apparatus of claim 26, wherein the femto base stations use a same frequency resource.

32. The communication apparatus of claim 26, wherein:
  a radio resource for the downlink coordination zone is a frequency resource, or a time resource, or a space resource, or a code resource, or any combination thereof; and
  the radio resource is divided into the first interval and the second interval.

33. The communication apparatus of claim 26, wherein the communication apparatus is a relay station, or a terminal among the terminals, or a femto base station among the femto base stations.

34. The communication apparatus of claim 1, wherein the femto base stations command the terminals to transmit a sounding packet in order to estimate uplink channels of the terminals and transmit information of the estimated uplink channels to a control apparatus.

35. The communication apparatus of claim 1, wherein a control apparatus determines a shared radio resource for the particular terminals and a radio resource for the terminals in the downlink coordination zone, set the transmission framework based on the shared radio resource and the radio resource, wherein the downlink coordination zone, the downlink shared zone, an uplink coordination zone, and an uplink shared zone, is variably adjusted according to the shared radio resource and the radio resource.

* * * * *